United States Patent
Nambannor Kunnath et al.

(10) Patent No.: US 12,218,952 B2
(45) Date of Patent: Feb. 4, 2025

(54) PEER-TO-PEER OFFLINE ACCESS MODE

(71) Applicant: Omnissa, LLC, Mountain View, CA (US)

(72) Inventors: Ramanandan Nambannor Kunnath, Bangalore (IN); Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 80 days.

(21) Appl. No.: 18/108,566

(22) Filed: Feb. 10, 2023

(65) Prior Publication Data
US 2024/0214388 A1    Jun. 27, 2024

(30) Foreign Application Priority Data
Dec. 21, 2022    (IN) .............................. 202241074214

(51) Int. Cl.
*H04L 9/40*    (2022.01)
(52) U.S. Cl.
CPC .......... *H04L 63/108* (2013.01); *H04L 63/102* (2013.01); *H04L 63/20* (2013.01)
(58) Field of Classification Search
CPC ............... H04L 63/108; H04L 63/0807; H04L 63/0823; H04L 63/10
See application file for complete search history.

(56) References Cited

U.S. PATENT DOCUMENTS

| | | | |
|---|---|---|---|
| 11,582,201 B1* | 2/2023 | Moon | H04L 63/061 |
| 2015/0089571 A1* | 3/2015 | Srinivasan | H04W 12/06 726/1 |
| 2015/0256545 A1* | 9/2015 | Dotterer, III | H04L 67/10 726/1 |
| 2018/0336334 A1* | 11/2018 | Yadav | G06F 21/445 |
| 2018/0351938 A1* | 12/2018 | Vongsouvanh | H04W 12/08 |
| 2023/0231909 A1* | 7/2023 | Moon | G06F 21/606 709/203 |
| 2024/0137358 A1* | 4/2024 | Nambannor Kunnath | H04L 63/0823 |
| 2024/0214221 A1* | 6/2024 | Nambannor Kunnath | H04L 63/0823 |
| 2024/0214388 A1* | 6/2024 | Nambannor Kunnath | H04L 63/20 |

* cited by examiner

*Primary Examiner* — Ponnoreay Pich
(74) *Attorney, Agent, or Firm* — Kim & Stewart LLP (57) ABSTRACT

Disclosed are various embodiments for enabling an enrolled client device of a user to access an enterprise resource via a second enrolled client device of the user. One such method comprises launching, by the first client device, a peer-to-peer communication channel between the first client device and a second client device of the user that is online with the management server; transmitting, by the first client device, a peer-to-peer offline access mode request over the peer-to-peer communication channel for the first client device to be given access to an enterprise resource that is being managed by the management server, wherein the request includes instructions for the second client device to forward the request to the management server, wherein the request further includes enterprise resource identification and verification data showing that the first client device is in compliance with a compliancy policy of the management service.

20 Claims, 4 Drawing Sheets

PEER-TO-PEER OFFLINE ACCESS MODE

RELATED APPLICATIONS

Benefit is claimed under 35 U.S.C. 119(a)-(d) to Foreign Application Ser. No. 202241074214 filed in India entitled "PEER-TO-PEER OFFLINE ACCESS MODE", on Dec. 21, 2022, by VMware, Inc., which is herein incorporated in its entirety by reference for all purposes.

BACKGROUND

Configurations for client devices are often managed by management services, such as mobile device management (MDM) services, unified endpoint management (UEM) services, etc. These management services can be used to ensure that managed client devices remain in compliance with various rules or compliance policies. For example, a management service could enforce a specific device configuration or application configuration settings in order to ensure compliance.

Certain enterprise resources, such as data content or applications, can only be accessed when a client device is online and connected. In such cases, the user is required to connect the client device to the Internet to access the desired content or application. However, there are instances when the user might not be able to or may choose to not connect the client device to the Internet. In such cases, if the content is not accessible on another client device of the user, then the user is left with no available options for accessing the desired content.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for enabling an enrolled client device of a user to access content and applications (that are being managed by a management service of an enterprise) via a second enrolled client device of the user. In cases, where the user has multiple client or user devices enrolled with the management service and used for accessing enterprise resources, there might be situations where some of the enrolled devices are offline either due to circumstances beyond the user's control or due intentional actions of the user, such that the offline device is unable to communicate with the management service to show compliance with enterprise policies. In such cases, users are currently prevented by the management service from accessing content or applications due to the offline status of the enrolled device. To solve this dilemma and in accordance with embodiments of the present disclosure, a peer-to-peer (P2P) offline access mode provides a communication channel for the offline enrolled device to communicate information, via an online enrolled device of the user, showing that the offline device is compliant with enterprise policies and can be trusted to access online content. For example, the health of the offline device can be verified using a secure P2P channel with the second enrolled client device, thus allowing the offline client device to show compliance with enterprise polices and be enabled to access enterprise resources, such as data content and/or applications, even when the device is offline. Accordingly, the P2P channel enables the management service to verify that the offline enrolled device is compliant and to also verify that the online enrolled device (second enrolled client device) is compliant to which the offline device is communicating over the P2P channel, where the online enrolled device can communicate to the management service via a communication network, such as the Internet.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
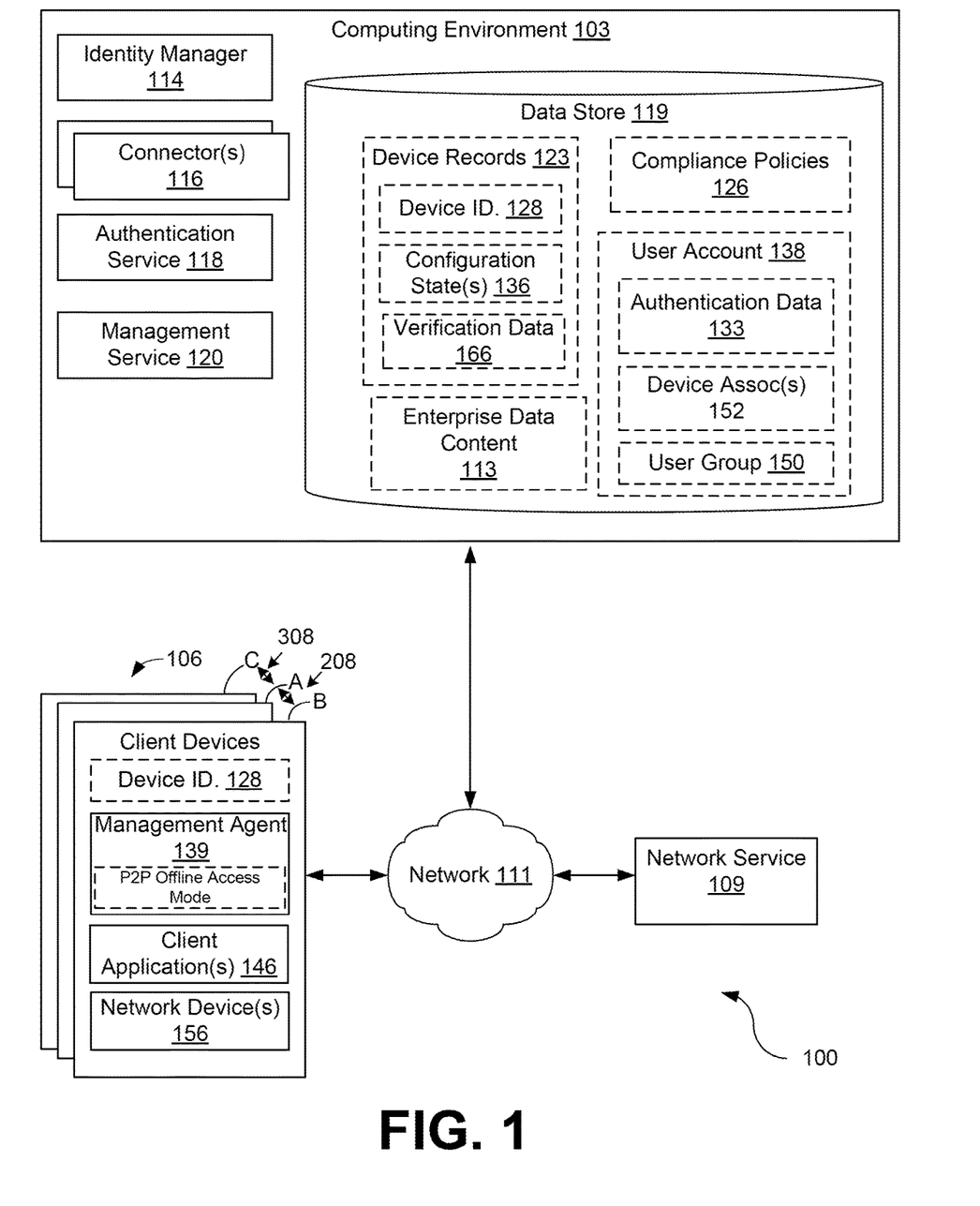
FIG. 1 is a drawing of a network environment according to various embodiments of the present disclosure.

With reference to FIG. 1, shown is a network environment 100 according to various embodiments. The network environment 100 can include a computing environment 103, one or more client devices 106, and a network service 109, which can be in data communication with each other via a network 111. The network 111 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 111 can also include a combination of two or more networks 111. Examples of networks 111 can include the Internet, intranets, extranets, virtual private networks (VPNs), and similar networks. A peer-to-peer communication channel can include direct client device 106 to client device 106 communications over a network 111. The network 111 can include permanent and ad-hoc networks, networks generated by the client devices 106 themselves, and device-to-device communications over networks provided or facilitated using routers and other devices.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 114, one or more connectors 116, an authentication service 118, and a management service 120. Correspondingly, computing devices hosting the respective services can be referred to as servers. For example, one or more computing devices hosting the management service 120 can be referred to as management server(s).

The identity manager 114 can authenticate users and manage user authorizations or permissions to access applications, data, or other computing resources. For example, the identity manager 114 can correspond to a single sign-on portal that verifies a user's authentication data 133, which can include authentication credentials, an authentication token (e.g., single sign-on token) that identifies the user, and verifies whether the user has the appropriate access and permissions to access enterprise data and functionalities of the computing environment 103 and/or one or more network services 109 according to compliance policies 126. The network services 109 which can include services that can provide user access to enterprise data. Examples of identity managers 114 include VMWARE's Identity Manager, Workspace ONE®, or MICROSOFT's Active Directory Federation Services.

A connector 116 can provide a standardized mechanism for the assistant connection service to communicate with a network service 109. Each network service 109 may provide an application programming interface (API) for communicating, querying, or otherwise interacting with the network service 109, which can include different methods or functions with different parameters compared to other network services 109. This can allow for the assistant connection service to send a single, uniformly formatted query to one or more connectors 116. Each connector 116 is then responsible for using the information provided in the query from the assistant connection service to invoke the appropriate functions provided by the API of the network service 109. To add support for a new network service 109, a new connector 116 can be created without needing to modify the assistant connection service itself. Likewise, if a change is made to the API of the network service 109, the connector 116 between the assistant connection service and the federated service can be updated without having to modify the assistant connection service itself.

The authentication service 118 can retrieve and cache authentication data, such as authentication tokens and refresh tokens, provided by various network services 109 accessible over a network 111. The cached authentication data can be used by an assistant connection service to query the network services 109 for information.

Various applications or other functionality can be executed in the computing environment 103. Moreover, one or more of these applications could be executed on the same computing device within the computing environment 103 or on one or more separate computing devices within the computing environment 103.

Also, various data is stored in a data store 119 that is accessible to the computing environment 103. The data store 119 can be representative of a plurality of data stores 119, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 119 is associated with the operation of the various applications or functional entities described below. This data can include one or more user accounts 138, one or more device records 123, one or more compliance policies 126, one or more authentication data 133, as well as potentially other data.

A device record 123 can be used to store any information related to a client device 106 enrolled with or managed by the management service 120. This can include any information about the current or last known state of the client device 106, such as applications installed on the client device or the last reported state of the client device 106. This can also include information about the user who is currently using the client device 106. Accordingly, the device record 123 can include information such as a device identifier 128, and one or more configuration states 136.

The device identifier 128 can include any identifier that uniquely identifies one client device 106 with respect to another client device 106. Examples of device identifiers 128 include device names, globally unique identifiers (GUIDs), universally unique identifiers (UUIDs), network interface media access controller (MAC) addresses, international mobile equipment identity (IMEI) numbers, etc. Device identifier 128 can also include a public key such as a public key peer-to-peer verification certificate, a private key for one or more client devices 106, and other information.

A configuration state 136 can represent any current or past configuration of the client device 106. The configuration state 136 can include values to be used for operating system settings for the client device 106 or for settings for individual applications installed on the client device 106. Text or markup language files (e.g., extensible markup language (XML) or yet another markup language (YAML) files) could be used to store a configuration state 136.

A compliance policy 126 can represent one or more policies (of an enterprise) that must be satisfied by client device 106 when applied to the client device 106. Compliance policies 126 can specify a range of configuration settings or options that the current configuration state 136 of the client device 106 must satisfy in order to be considered compliant. For example, a compliance policy 126 could specify that certain applications are required to be installed on the client device 106 or are prohibited from being installed on the client device 106. As another example, a compliance policy 126 could specify a minimum version of an application installed on the client device 106 or minimum operating system version for the client device 106. Similarly, a compliance policy 126 could specify prohibited versions of applications, such as versions that contain a known or unpatched security vulnerability. A compliance policy 126 could also specify permitted or prohibited network connections, domain name system (DNS) servers, virtual private network (VPN) configurations or settings, etc. A compliance policy could also specify that an enrolled client device 106 should be online in order to verify its compliance with enterprise policies and/or access enterprise resources, such as data content/files or applications. As another example, the one or more compliance rules representing the policy 116 can include general conditions with which the client device 106 must comply to be secure for enterprise use. The one or more compliance rules can specify, for instance, that certain applications executed by the client device 106 have not been offline from the management service 120 for greater than a specified amount of time. Although these examples are illustrative of the types of compliance policies 126 that could be deployed, other mandatory configuration settings could be specified by one or more compliance policies 126.

The user account 138 represents information associated with a user. The information can include authentication data 133. The authentication data 133 can include one or more authentication credentials, one or more single sign-on tokens, and/or one or more access permissions applied to the user account 138, as well as cached authentication tokens and refresh tokens. The user account 138 can be associated with a compliance policy 126, as well as one or more client devices 106. In some examples, a compliance policy 126 can be applied to all client devices 106 associated with a particular user account 138 or a particular user group 150. One or more compliance policies 158 can be applied to a single client device 106. In some examples, a specific compliance policy 126 can be created for a particular client device 106 as well.

Authentication credentials represent the credentials that a user can present to the identity manager 114 to authenticate the user's identity. Authentication credentials can include a combination of a username and password, a cryptographic certificate, a one-time password, or a combination of several of the authentication credentials as part of a multi-factor authentication schema. Examples of one-time passwords can include a one-time password generated using a version of the time-based one-time password (TOTP) algorithm or a one-time password generated using the HMAC-based one-time password (HOTP) algorithm.

The access permissions represent computing resources that the user account is authorized to access. For example, the access permissions can indicate that a user account is permitted to access some network services 109 but is prohibited from accessing other network services 109. As another example, the access permissions can indicate that the user account 138 can access certain features of a network service 109 but prohibited from accessing other features. For example, if one of the network services 109 that a user was permitted to access was a customer relationship management (CRM) service, the user might have permission to access his or her own contacts but be prohibited from accessing the sales contacts of other users. In some implementations, the access permissions can be defined at a user group level rather than at a user level in a directory service.

An authentication token is a token provided by the identity manager 114 or the network service 109 in response to a successful authentication of the user. The authentication token represents that a user account 138 is currently authenticated to access a network service 109 and authorized to access or otherwise interact with the network service 109 in some capacity. For security purposes, the authentication token often has a time-limit associated with it, (such as 5 minutes, 1 hour, 3 hours, 6 hours, 8 hours, or some other period of time). Once the time-limit has expired, the authentication token can no longer be used to prove current authentication status of the user account 138 with the network service 109. The authentication token can be provided, for example, as part of an authentication exchange using a version of the OAUTH protocol. In some instances, such as those implementing a version of the KERBEROS protocol, a separate authentication token can be generated for each network service 109 that the client device 106 attempts to access on behalf of the user. In other instances, the authentication token can be generated and used to provide the client device 106 with access to several of the network services 109. Although each of the network services 109 can have a different set of authentication credentials linked to the user account 138, such as a different username and password combination, the authentication token allows the user to authenticate once with the identity manager 114 in order to use each of the network services 109 instead of having to authenticate with each of the network services 109 separately.

A refresh token is a token provided by one of the network services 109 in response to a successful authentication with the network service 109. The refresh token can be used to acquire a new authentication token once a current or previous authentication token expires. The refresh token often has a much longer time-limit associated with it, such as 1 day, 1 week, 30 days, 3 months, or 1 year, which allows for the refresh token to be used to acquire a series of authentication tokens after an initial successful authentication. In the event that a user's access is revoked, the refresh token can be marked invalid, preventing the refresh token from being used to acquire new authentication tokens. The refresh token can be provided, for example, as part of an authentication exchange using a version of the OAUTH protocol.

The management service 120 can be executed to manage the configuration of registered or enrolled client devices 106. This can include evaluating individual compliance policies 126 to determine an appropriate configuration state 136 for a client device 106 and distributing the configuration state 136 to client devices 106. The management service 120 can also provide various facilities or mechanisms to determine or otherwise ensure that enrolled client devices 106 are compliant with the applicable compliance policies 126.

The client device 106 is representative of a plurality of client devices that can be coupled to the network 111. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a management agent 139 and one or more client applications 146. The management agent 139 can be configured to locally manage the client device 106 in order to enforce configuration settings specified by the management service 120 in the configuration state 136. The management agent 139 can be installed with elevated privileges or be effectuated through operating system APIs to manage the client device 106 on behalf of the management service 120. The management agent 139 can have the authority to manage data on the client device 106, install, remove, or disable certain applications, or install configuration profiles, such as VPN certificates, Wi-Fi profiles, email profiles, etc. The management agent 139 can also have the authority to enable or disable certain hardware features of the client device 106 that as specified in the configuration state 136 for the client device 106. The management agent 139 can also place the device into different hardware modes, such as airplane mode, silent mode, do-not-disturb mode, P2P mode, P2P offline access mode, or other modes supported by the client device 106.

The network service 109 to which a client application 146 corresponds can require some form of user authentication before providing the client application 146 with user-specific data or information. For example, the network service 109 might be a salesforce tool that contains highly sensitive user and enterprise data. Accordingly, a client application 146 can include a management application that is communicatively linked to, and works in concert with, the management service 120. The client application 146 can also authenticate a user's access to the network service 109. In this way, once a user has associated the network service 109 and other services with his or her user account 138 by authenticating with the identity manager 114, the identity manager 114 can also allow the user to access network services 109 that have federated their authentication to the identity manager 114.

Next, a general description of the operation of the various components of the network environment 100 is provided. Although the following description provides an example of the operation of the network environment 100, other interactions between the various components of the network environment 100 are also included within the scope of the various embodiments of the present disclosure. More detailed descriptions of the operations of specific components of the network environment 100 are provided in the discussion accompanying FIGS. 2-4.

To begin, the management service 120 can enroll one or more client devices 106 of a user for mobile device management or unified endpoint management (UEM) services. Accordingly, the management service 120 can identify and authenticate one of the client devices 106 and store data related to the client device 106 in a device record 123 for later reference. In some cases, the management service 120 can also be registered as a device administrator of the client device 106, permitting the management service 120 to configure and manage certain operating aspects of the client device 106.

The management service 120 can also determine which compliance policies 126 are applicable to the enrolled or registered client device 106 and create an appropriate configuration state 136 for the client device 106. For example, the management service 120 could evaluate any groups or roles that the client device 106 has been assigned to, and then select any compliance policies 126 assigned to those groups or roles. Moreover, the management service 120 could evaluate any compliance policies 126 that were assigned to the client device 106 specifically. As a result of the evaluation, the management service 120 could generate a configuration state 136 for the client device 106 and save the configuration state 136 to the appropriate device record 123.

The management service 120 can then distributed the configuration state 136 to the client device 106. Meanwhile, the management agent 139 executing on the client device 106 can periodically evaluate the current state of the client device 106 to determine if is compliant with one or more compliance policies 126 or if its configuration state 136 is the current configuration state 136 published by the management service 120. The management agent 139 could then apply the current configuration state 136 to the client device 106.

Figure 2:
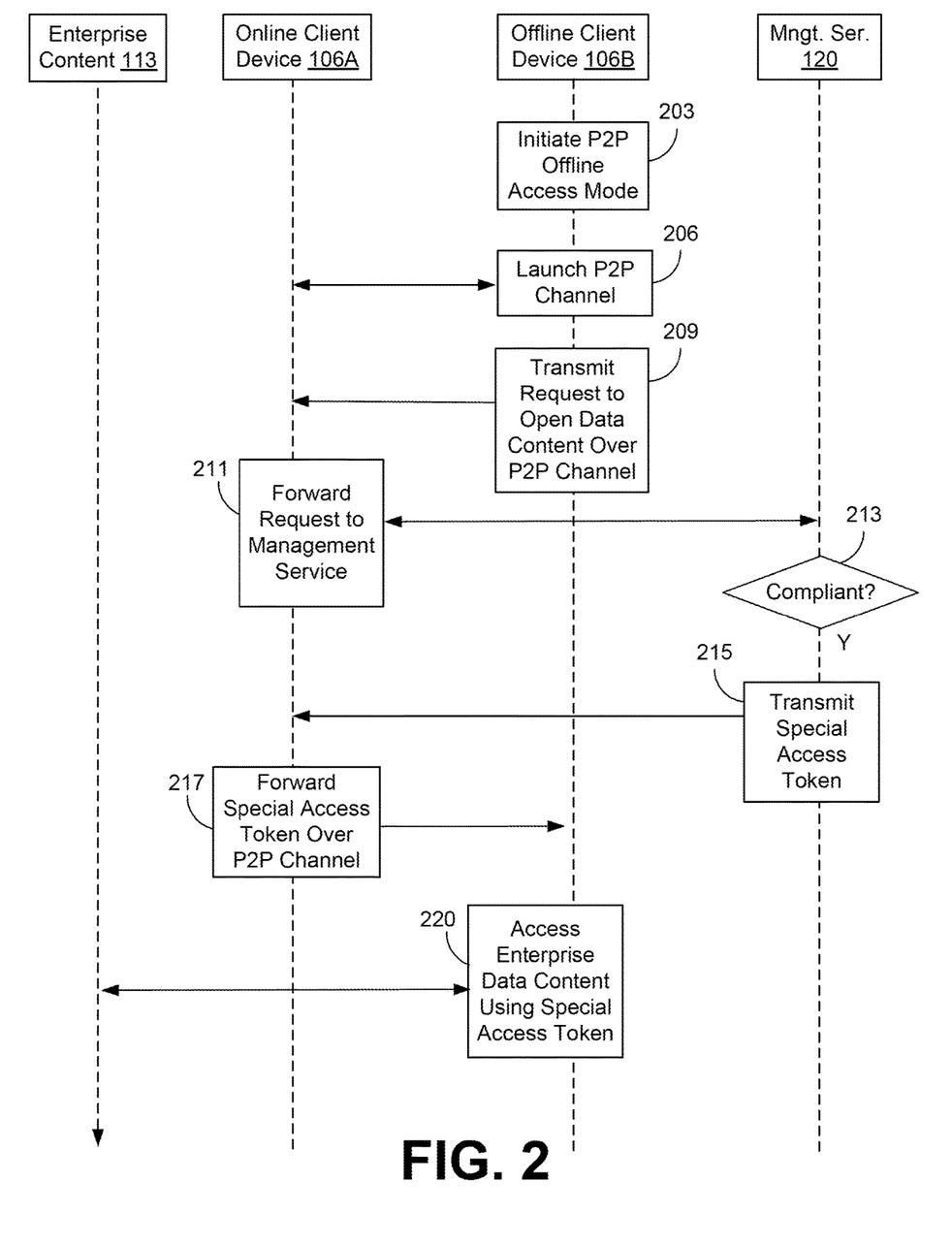
FIGS. 2-4 are sequence diagrams illustrating examples of functionality implemented as portions of an application executed in a computing environment in the network environment of FIG. 1 according to various embodiments of the present disclosure for initiating a peer-to-peer (P2P) offline access mode.

Referring next to FIG. 2, shown is a scenario that illustrates how interactions between the components of the networked environment 100 of FIG. 1 can operate. Generally, this example shows how a plurality of client devices 106A, 106B of a user (the client devices 106) can interact using peer-to-peer communications to enable an offline client device 106B to access enterprise data content 113 (e.g., data or files stored in data store 119), a network service 109, or a specific client application 146.

In FIG. 2, client devices 106A and 106B can be in a same peer-to-peer zone or area. The peer-to-peer zone can refer to a zone or area associated with a network 111 accessible by multiple client devices 106A and 106B. This can include an area where a WiFi, Bluetooth, or another network is accessible by the client devices 106A and 106B. The network services 109 can be generated by one or more of the client devices 106, by a gateway or router device, or by another device.

Accordingly, consider a scenario in which two client devices of the user, devices 106A and 106B, are enrolled with a management service 120, in which client device 106A is online and in communications with the management service 120 and client device 106B is offline and not communicatively coupled with the management service 120.

In step 203, the client device 106B intends to access enterprise data content 113 which has been secured with a read-only-when-online-mode level of protection, which requires that a requesting client device be communicatively coupled with the management service 120 and verify its compliance with enterprise policies 126 before access is granted to view or open the enterprise data content 113. In the situation that the client device 106B is not in compliance, the management agent 139 of the client device 106B can be configured to install or uninstall client applications 146 specified by the configuration state 136 that should or should not be installed on the client device. Similarly, the management agent 139 could update application or operating system settings specified in the configuration state 136 to new values specified in configuration state 136.

However, after the client device 106B is verified to be in compliance and since the client device 106B is detected to be offline (and not communicatively coupled with the management service), the management agent 139 of the client device 106B initiates a P2P offline access mode, which can result in a peer-to-peer (P2P) channel 208 being launched with an available online client device 106A, in step 206.

In various embodiments, management agent 139 of client device 106B can detect a presence of the client device 106A. For example, the client device 106A can execute the management agent 139 (for client device 106A), and the client device 106B can execute the management agent 139 (for client device 106B). The management agents 139, or other management instructions executed by the client devices 106, can provide a peer-to-peer discovery API that pings for nearby client devices 106 using any one or more of the respective network devices 156 of the client devices 106. Specifically, the client device 106B can invoke the peer-to-peer discovery API, and the client device 106A can respond and establish a direct peer-to-peer communication channel with the offline client device 106B.

This device discovery ping can include a command, signal, or other predetermined discovery message that is unique to the management service 120 and/or a particular enterprise. The device discovery message is recognizable by the peer-to-peer discovery API or another management agent component. The peer-to-peer discovery API or another management agent component can respond using a predetermined response message that is unique to the management service 120 and/or a particular enterprise.

In step 209, offline client device 106B transmits or sends a request to online client device 106A over the P2P channel to forward its P2P offline access mode request to open the enterprise data content 113, where the request includes payload data comprising enterprise data content identification, heartbeat, and/or interrogation information (e.g., public key certificate and/or device identifier) showing the client device 106B to be in compliance with enterprise compliance policies 126. In various embodiments, the request is encrypted via a device certificate of the client device 106B. Accordingly, the management agent 139 can include a private key (B) that was generated and provided by the management service 120, for example, upon enrollment. The private key (B) can be specific to the client device 106B. The management agent 139 can sign and/or symmetrically encrypt the verification data 166 using the private key (B). The offline client device 106B can then transmit the signed or encrypted request data to the online client device 106A over the P2P channel, where the data can be decrypted using a public key (B) of the client device 106B, in various embodiments.

As such, the request can include verification data 166 such as a public key peer-to-peer verification certificate (the public key certificate (B)) that can identify the client device 106B as owner of the public key and/or associated private key assigned to the client device 106B during enrollment of the client device 106B with the management service 120. The public key certificate (B) can also identify the entity that issued the certificate such as a certificate authority, the management service 120, or the client device 106B. The public key certificate (B) can also specify a period of time that the public key certificate (B) is valid.

The verification data 166 can also include heartbeat data. The heartbeat data can include basic information about the client device 106B, such as a device identifier, operating system, hardware information, device model or type, and so on. The verification data 166 can also include a unique time-based session token (B) generated by the management agent 139 at request generation time of the offline P2P offline access mode request. The verification data 166 can be specific to the client device 106B.

In some cases, multiple client devices can be detected, and the management agent 139 can select the client device 106A that shares a user group 150 or a compliance policy 126 with the client device 106B and/or is identified as being associated with the same user in a device association(s) record 152. In some examples, the management agent 139 can transmit a list of detected client devices to the management service 120, and the management service 120 can select the client device 106A for the P2P offline access mode request. The management service 120 can select the client device 106A that shares a user group 150 or a compliance policy 126 with the client device 106B and/or is identified as being associated with the same user in a device association(s) record 152.

The online client device 106A receives the P2P offline access mode request from offline client device 106B (over the P2P channel). As discussed, the client device 106A can decrypt the payload using the public key (B) and can then re-encrypt the payload using its private key (A) and forward the request to the management service 120, such as by transmission over the Internet, in step 211.

The management service 120 can decrypt the encrypted payload data of the request, which is encrypted using the private key (A) specific to client device 106A. The management service 120 can have access to a symmetrical or asymmetrical key for decryption of data encrypted using the private key (A). For example, management service 120 can have access to the public key (A), since it was provided as part of an enrollment process with the management service 120. If signed, the management service 120 can use an associated public key (A) to confirm the signature created using the private key (A).

In step 213, the management service 120 processes the P2P offline access mode request and verifies if offline client device 106B is compliant with enterprise policies 126 and/or if the requested enterprise data content is enabled for P2P offline access mode. The management service 120 can confirm an enrollment status of the client device 106B. For example, the management service 120 can confirm that the public key certificate (B) and/or device identifier (B) matches data stored in association with the client device 106B and a user account 138. The management service 120 can confirm that the session token (B) matches an expected format, is generated using an expected token generation algorithm, and that the session token (B) is unexpired or is received within a predetermined time frame from a timestamp of the session token (B).

If the offline client device 106B and the enterprise data content are compliant with enterprise policies, the management service 120 generates a special access token having a specified expiration period and transmits the special access token to online client device 106A (over a client/server network, including the Internet) as an encrypted payload using public keys of the online client device 106A.

Accordingly, the management service 120 can encrypt the special access token payload data using a public key (A) that was generated and provided by the management service 120, for example, upon enrollment of client device 106A. The public key (A) can be specific to the client device 106A. The management service can sign and/or symmetrically encrypt the payload data using the public key (A). In step 215, the management service 120 can then transmit the signed or encrypted special access token payload to the online client device 106A (over a client/server network, including the Internet), where the client device 106A can decrypt the payload using a private key (A) associated with the public key (A) in an asymmetric encryption scheme. Subsequently, client device 106A can re-encrypt the payload using its private key (A) and forward the special access token payload to the client device 106B over the P2P channel, in step 217.

Client device 106B decrypts the payload and the management agent 139 of client device 106B uses the special access token and loads the expiration time/period into the management agent application and allows the client device 106B to access the enterprise data content 113. In various embodiments, whenever the content 113 is accessed, the special access token is used to communicate to the management service 120 via any nearby enrolled online device present in the P2P channel and once validated by the management service, the user is provided access, in step 220. If the time period for the special access token expires, access to the content 113 will be restricted and a new peer-to-peer offline access mode request process will need to be repeated. Accordingly, in various embodiments, access to the enterprise data content may be facilitated by peer-to-peer communications using the P2P channel and an available peer device, such as client device 106A of the same user, if the offline client device 106B cannot access the enterprise data content on their own.

Figure 3:
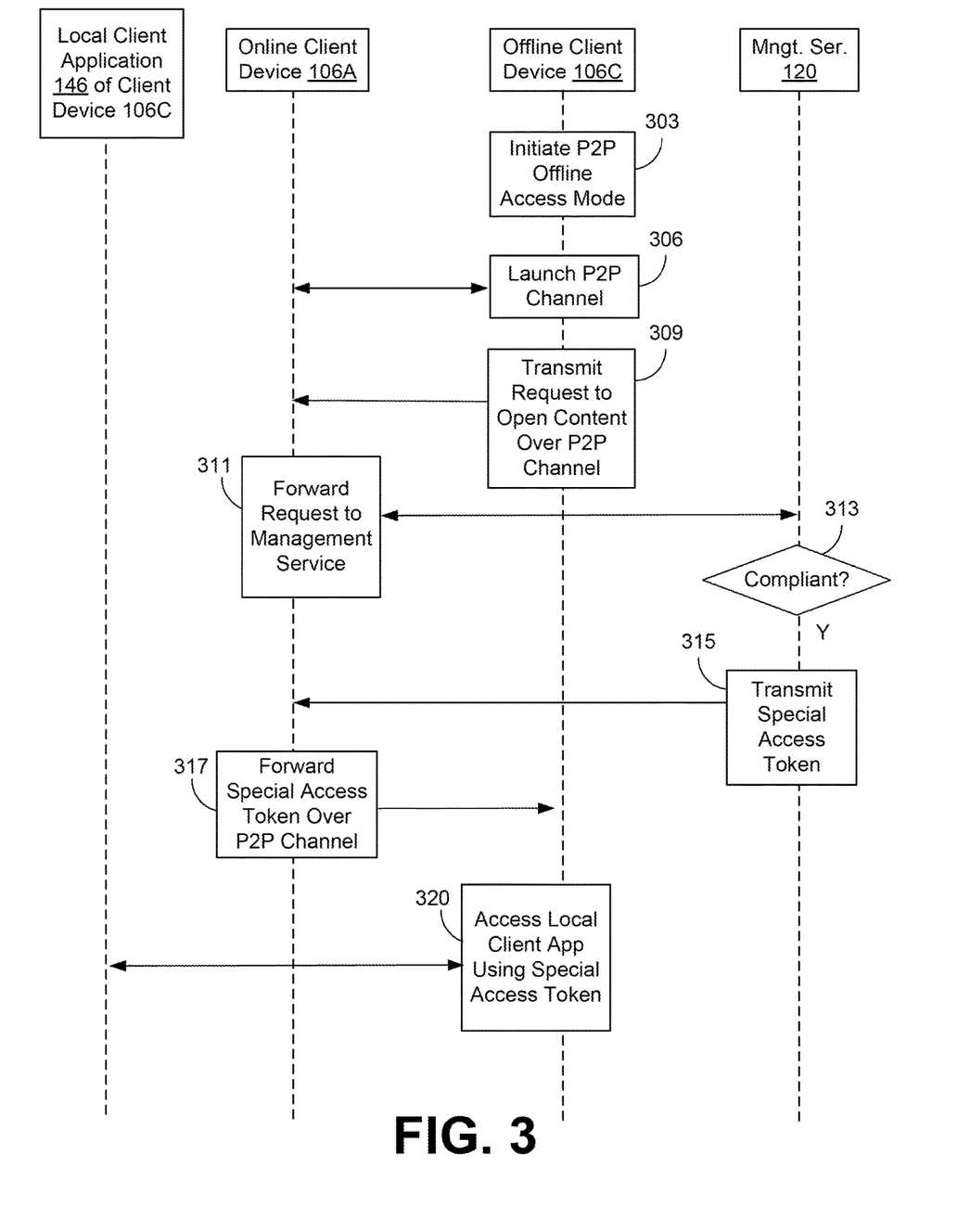

Next, consider a scenario in which two client devices of the user, devices 106A and 106C, are enrolled with a management service 120, in which client device 106A is online and in communications with the management service 120 and client device 106C is offline and not communicatively coupled with the management service 120. In FIG. 3, the client devices 106A and 106C can be in a same peer-to-peer zone or area. The peer-to-peer zone can refer to a zone or area associated with a network 111 accessible by multiple client devices 106A and 106C. This can include an area where a WiFi, Bluetooth, or another network is accessible by the client devices 106A and 106C. The network services 109 can be generated by one or more of the client devices 106, by a gateway or router device, or by another device.

In step 303, the client device 106C is offline and intends to access a local client application 146 of the client device 106C which has been secured with a access-only-when-online-mode level of protection, which requires that a requesting client device be communicatively coupled with the management service 120 and verify its compliance with enterprise policies 126 before access is granted to view or open the client application 146. In the situation that the client device 106B is not in compliance, the management agent 139 of the client device 106B can be configured to install or uninstall client applications 146 specified by the configuration state 136 that should or should not be installed on the client device. Similarly, the management agent 139 could update application or operating system settings specified in the configuration state 136 to new values specified in configuration state 136. However, after the client device 106B is verified to be in compliance and since the client device 106B is detected to be offline (and not communicatively coupled with the management service), the management agent 139 of the client device 106C initiates a P2P offline access mode, which can result in a peer-to-peer (P2P) channel 308 being launched with an available online client device 106A, in step 306.

In various embodiments, management agent 139 of client device 106C can detect a presence of the client device 106A. For example, the client device 106A can execute the management agent 139 (for client device 106A), and the client device 106C can execute the management agent 139 (for client device 106C). The management agents 139, or other management instructions executed by the client devices 106, can provide a peer-to-peer discovery API that pings for nearby client devices 106 using any one or more of the respective network devices 156 of the client devices 106. Specifically, the client device 106C can invoke the peer-to-peer discovery API, and the client device 106A can respond and establish a direct peer-to-peer communication channel with the offline client device 106C.

This device discovery ping can include a command, signal, or other predetermined discovery message that is unique to the management service 120 and/or a particular enterprise. The device discovery message is recognizable by the peer-to-peer discovery API or another management agent component. The peer-to-peer discovery API or another management agent component can respond using a predetermined response message that is unique to the management service 120 and/or a particular enterprise.

In step 309, offline client device 106C transmits or sends a request to online client device 106A over the P2P channel to forward its P2P offline access mode request to open the local client application 146, where the request includes payload data comprising client application identification, heartbeat, and/or interrogation information (e.g., public key certificate and/or device identifier) showing the client device 106C to be in compliance with enterprise compliance policies 126. In various embodiments, the request is encrypted via a device certificate of the client device 106C. Accordingly, the management agent 139 can include a private key (C) that was generated and provided by the management service 120, for example, upon enrollment. The private key (C) can be specific to the client device 106C. The management agent 139 can sign and/or symmetrically encrypt the verification data 166 using the private key (C). The offline client device 106C can then transmit the signed or encrypted request data to the online client device 106A over the P2P channel, where the data can be decrypted using a public key (C) of the client device 106C, in various embodiments.

As such, the request can include verification data 166 such as a public key peer-to-peer verification certificate (the public key certificate (C)) that can identify the client device 106C as owner of the public key and/or associated private key assigned to the client device 106C during enrollment of the client device 106C with the management service 120. The public key certificate (C) can also identify the entity that issued the certificate such as a certificate authority, the management service 120, or the client device 106C. The public key certificate (C) can also specify a period of time that the public key certificate (C) is valid.

The verification data 166 can also include heartbeat data. The heartbeat data can include basic information about the client device 106C, such as a device identifier, operating system, hardware information, device model or type, and so on. The verification data 166 can also include a unique time-based session token (C) generated by the management agent 139 at request generation time of the offline P2P offline access mode request. The verification data 166 can be specific to the client device 106C.

In some cases, multiple client devices can be detected, and the management agent 139 can select the client device 106A that shares a user group 150 or a compliance policy 126 with the client device 106C and/or is identified as being associated with the same user in a device association(s) record 152. In some examples, the management agent 139 can transmit a list of detected client devices to the management service 120, and the management service 120 can select the client device 106A for the P2P offline access mode request. The management service 120 can select the client device 106A that shares a user group 150 or a compliance policy 126 with the client device 106C and/or is identified as being associated with the same user in a device association(s) record 152.

The online client device 106A receives the P2P offline access mode request from offline client device 106C (over the P2P channel). As discussed, the client device 106A can decrypt the payload using the public key (C) and can then re-encrypt the payload using its private key (A) and forward the request to the management service 120, such as by transmission over the Internet, in step 311.

The management service 120 can decrypt the encrypted payload data of the request, which is encrypted using the private key (A) specific to client device 106A. The management service 120 can have access to a symmetrical or asymmetrical key for decryption of data encrypted using the private key (A). For example, management service 120 can have access to the public key (A), since it was provided as part of an enrollment process with the management service

120. If signed, the management service 120 can use an associated public key (A) to confirm the signature created using the private key (A).

In step 313, the management service 120 processes the P2P offline access mode request and verifies if offline client device 106C is compliant with enterprise policies 126 and/or if the requested client application is enabled for P2P offline access mode. The management service 120 can confirm an enrollment status of the client device 106C. For example, the management service 120 can confirm that the public key certificate (C) and/or device identifier (C) matches data stored in association with the client device 106C and a user account 138. The management service 120 can confirm that the session token (C) matches an expected format, is generated using an expected token generation algorithm, and that the session token (C) is unexpired or is received within a predetermined time frame from a timestamp of the session token (C).

If the offline client device 106C and the local client application 146 are compliant with enterprise policies, the management service 120 generates a special access token having a specified expiration period and transmits the special access token to online client device 106A (over a client/server network, including the Internet) as an encrypted payload using public keys of the online client device 106A.

Accordingly, the management service 120 can encrypt the special access token payload data using a public key (A) that was generated and provided by the management service 120, for example, upon enrollment of client device 106A. The public key (A) can be specific to the client device 106A. The management service can sign and/or symmetrically encrypt the payload data using the public key (A). In step 315, the management service 120 can then transmit the signed or encrypted special access token payload to the online client device 106A (over a client/server network, including the Internet), where the client device 106A can decrypt the payload using a private key (A) associated with the public key (A) in an asymmetric encryption scheme. Subsequently, client device 106A can re-encrypt the payload using its private key (A) and forward the special access token payload to the client device 106C over the P2P channel, in step 317.

Client device 106C decrypts the payload and the management agent 139 of client device 106C uses the special access token and loads the expiration time/period into the management agent application and allows the client device 106C to access the local client application 146. In various embodiments, whenever the application 146 is accessed, the special access token is used to communicate to the management service 120 via any nearby enrolled online device present in the P2P channel and once validated by the management service, the user is provided access to the local client application 146 by the local management agent 139, in step 320. If the time period for the special access token expires, access to the local client application 146 will be restricted and a new peer-to-peer offline access mode request process will need to be repeated.

Figure 4:
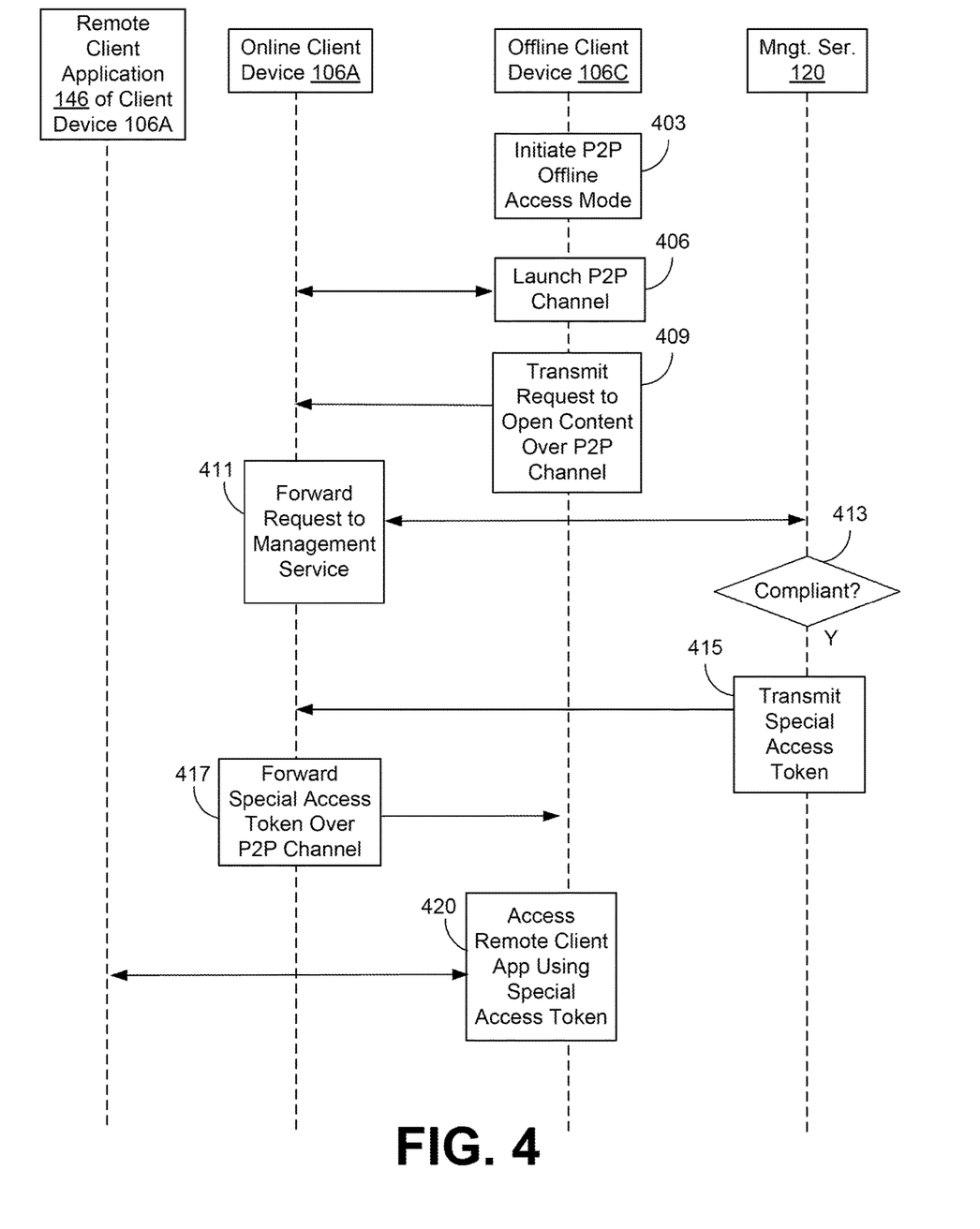

Correspondingly, access to a remote client application may also be facilitated by peer-to-peer communications using the P2P channel and an available peer device, such as client device 106A of the same user, if the remote client application utilizes network communications that are not available by a requesting client device 106C and likewise are not currently available to a corresponding client application on the client device 106C. Accordingly, consider a scenario in which two client devices of the user, devices 106A and 106C, are enrolled with a management service 120, in which client device 106A is online and in communications with the management service 120 and client device 106C is offline and not communicatively coupled with the management service 120. In FIG. 4, the client devices 106A and 106C can be in a same peer-to-peer zone or area. The peer-to-peer zone can refer to a zone or area associated with a network 111 accessible by multiple client devices 106A and 106C. This can include an area where a WiFi, Bluetooth, or another network is accessible by the client devices 106A and 106C. The network services 109 can be generated by one or more of the client devices 106, by a gateway or router device, or by another device.

In step 403, the client device 106C is offline and intends to access a client application 146 of another client device 106A which has been secured with a access-only-when-online-mode level of protection, which requires that a requesting client device be communicatively coupled with the management service 120 and verify its compliance with enterprise policies 126 before access is granted to view or open the client application 146. In the situation that the client device 106B is not in compliance, the management agent 139 of the client device 106B can be configured to install or uninstall client applications 146 specified by the configuration state 136 that should or should not be installed on the client device. Similarly, the management agent 139 could update application or operating system settings specified in the configuration state 136 to new values specified in configuration state 136. However, after the client device 106B is verified to be in compliance and since the client device 106B is detected to be offline (and not communicatively coupled with the management service), the management agent 139 of the client device 106C initiates a P2P offline access mode, which can result in a peer-to-peer (P2P) channel being launched 308 with an available online client device 106A, in step 406.

In various embodiments, management agent 139 of client device 106C can detect a presence of the client device 106A. For example, the client device 106A can execute the management agent 139 (for client device 106A), and the client device 106C can execute the management agent 139 (for client device 106C). The management agents 139, or other management instructions executed by the client devices 106, can provide a peer-to-peer discovery API that pings for nearby client devices 106 using any one or more of the respective network devices 156 of the client devices 106. Specifically, the client device 106C can invoke the peer-to-peer discovery API, and the client device 106A can respond and establish a direct peer-to-peer communication channel with the offline client device 106C.

This device discovery ping can include a command, signal, or other predetermined discovery message that is unique to the management service 120 and/or a particular enterprise. The device discovery message is recognizable by the peer-to-peer discovery API or another management agent component. The peer-to-peer discovery API or another management agent component can respond using a predetermined response message that is unique to the management service 120 and/or a particular enterprise.

In step 409, offline client device 106C sends a request to online client device 106A over the P2P channel to forward its P2P offline access mode request to open a remote client application 146 on the client device 106A, where the request includes payload data comprising client application identification, heartbeat, and/or interrogation information (e.g., public key certificate and/or device identifier) showing the client device 106C to be in compliance with enterprise compliance policies 126. In various embodiments, the request is encrypted via a device certificate of the client device 106C. Accordingly, the management agent 139 can include a private key (C) that was generated and provided by the management service 120, for example, upon enrollment. The private key (C) can be specific to the client device 106C. The management agent 139 can sign and/or symmetrically encrypt the verification data 166 using the private key (C). The offline client device 106C can then transmit the signed or encrypted request data to the online client device 106A over the P2P channel, where the data can be decrypted using a public key (C) of the client device 106C, in various embodiments.

As such, the request can include verification data 166 such as a public key peer-to-peer verification certificate (the public key certificate (C)) that can identify the client device 106C as owner of the public key and/or associated private key assigned to the client device 106C during enrollment of the client device 106C with the management service 120. The public key certificate (C) can also identify the entity that issued the certificate such as a certificate authority, the management service 120, or the client device 106C. The public key certificate (C) can also specify a period of time that the public key certificate (C) is valid.

The verification data 166 can also include heartbeat data. The heartbeat data can include basic information about the client device 106C, such as a device identifier, operating system, hardware information, device model or type, and so on. The verification data 166 can also include a unique time-based session token (C) generated by the management agent 139 at request generation time of the offline P2P offline access mode request. The verification data 166 can be specific to the client device 106C.

In some cases, multiple client devices can be detected, and the management agent 139 can select the client device 106A that shares a user group 150 or a compliance policy 126 with the client device 106C and/or is identified as being associated with the same user in a device association(s) record 152. In some examples, the management agent 139 can transmit a list of detected client devices to the management service 120, and the management service 120 can select the client device 106A for the P2P offline access mode request. The management service 120 can select the client device 106A that shares a user group 150 or a compliance policy 126 with the client device 106C and/or is identified as being associated with the same user in a device association(s) record 152.

The online client device 106A receives the P2P offline access mode request from offline client device 106C (over the P2P channel). As discussed, the client device 106A can decrypt the payload using the public key (C) and can then re-encrypt the payload using its private key (A) and forward the request to the management service 120, such as by transmission over the Internet, in step 411.

The management service 120 can decrypt the encrypted payload data of the request, which is encrypted using the private key (A) specific to client device 106A. The management service 120 can have access to a symmetrical or asymmetrical key for decryption of data encrypted using the private key (A). For example, management service 120 can have access to the public key (A), since it was provided as part of an enrollment process with the management service 120. If signed, the management service 120 can use an associated public key (A) to confirm the signature created using the private key (A).

In step 413, the management service 120 processes the P2P offline access mode request and verifies if offline client device 106C is compliant with enterprise policies 126 and/or if the requested client application is enabled for P2P offline access mode. The management service 120 can confirm an enrollment status of the client device 106C. For example, the management service 120 can confirm that the public key certificate (C) and/or device identifier (C) matches data stored in association with the client device 106C and a user account 138. The management service 120 can confirm that the session token (C) matches an expected format, is generated using an expected token generation algorithm, and that the session token (C) is unexpired or is received within a predetermined time frame from a timestamp of the session token (C).

If the offline client device 106C and the remote client application 146 are compliant with enterprise policies, the management service 120 generates a special access token having a specified expiration period and transmits the special access token to online client device 106A (over a client/server network, including the Internet) as an encrypted payload using public keys of the online client device 106A.

Accordingly, the management service 120 can encrypt the special access token payload data using a public key (A) that was generated and provided by the management service 120, for example, upon enrollment of client device 106A. The public key (A) can be specific to the client device 106A. The management service can sign and/or symmetrically encrypt the payload data using the public key (A). In step 415, the management service 120 can then transmit the signed or encrypted special access token payload to the online client device 106A (over a client/server network, including the Internet), where the client device 106A can decrypt the payload using a private key (A) associated with the public key (A) in an asymmetric encryption scheme. Subsequently, client device 106A can re-encrypt the payload using its private key (A) and forward the special access token payload to the client device 106C over the P2P channel, in step 417.

Client device 106C decrypts the payload and the management agent 139 of client device 106C uses the special access token and loads the expiration time/period into the management agent application and allows the client device 106C to access the remote client application 146. In various embodiments, whenever the application 146 is accessed, the special access token is used to communicate to the management service 120 via any nearby enrolled online device present in the P2P channel and once validated by the management service, the user is provided access to the remote client application 146 by the local management agent 139 (of client device 106C) in concert with the remote management agent 139 of the online client device 106A, in step 420. If the time period for the special access token expires, access to the remote client application 146 will be restricted and a new peer-to-peer offline access mode request process will need to be repeated.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each step or block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more steps or blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

What is claimed is:

1. A system comprising:
a first client device comprising a processor and a memory; and
machine-readable instructions stored in the memory that, when executed by the processor, cause the first client device to at least:
detect that the first client device of a user is in an offline state, wherein the first client device is not currently communicatively coupled to a management server, wherein the first client device is enrolled with a management service hosted by the management server;
detect that a second client device of the user is in an online state, wherein the second client device is currently communicatively coupled to the management server, wherein the second client device is enrolled with the management service hosted by the management server;
launch a peer-to-peer communication channel between the first client device and the second client device of the user;
transmit a peer-to-peer offline access mode request over the peer-to-peer communication channel for the first client device to be given access to an enterprise resource that is being managed by the management server, wherein the request includes instructions for the second client device to forward the request to the management server, wherein the request further includes enterprise resource identification and verification data showing that the first client device is in compliance with a compliance policy of the management service; and
receive a special access token over the peer-to-peer communication channel, wherein the special access token is provided by the management server and enables the first client device access to the enterprise resource.

2. The system of claim 1, wherein the verification data comprises heartbeat information for the first client device and interrogation information.

3. The method of claim 2, wherein the verification data includes a time-based session token.

4. The system of claim 1, wherein the compliance policy comprises a rule requiring that the first client device needs to be communicatively coupled to the management service before access can be granted to the enterprise resource.

5. The system of claim 1, wherein the machine-readable instructions further cause the first client device to encrypt a payload of the peer-to-peer offline access mode request with a private key of the first client device.

6. The system of claim 1, wherein the special access token is time-limited and is set to expire after a defined time period.

7. The system of claim 1, wherein the enterprise resource comprises a data file stored in a data store remote from the first client application, a client application of the first client device, or a client application of the second client device.

8. A method, comprising:
detecting, by a first client device, that the first client device of a user is in an offline state, wherein the first client device is not currently communicatively coupled to a management server, wherein the first client device is enrolled with a management service hosted by the management server;
detecting, by the first client device, that a second client device of the user is in an online state, wherein the second client device is currently communicatively coupled to the management server, wherein the second client device is enrolled with the management service hosted by the management server;
launching, by the first client device, a peer-to-peer communication channel between the first client device and the second client device of the user;
transmitting, by the first client device, a peer-to-peer offline access mode request over the peer-to-peer communication channel for the first client device to be given access to an enterprise resource that is being managed by the management server, wherein the request includes instructions for the second client device to forward the request to the management server, wherein the request further includes enterprise resource identification and verification data showing that the first client device is in compliance with a compliance policy of the management service; and
receiving, by the first client device, a special access token over the peer-to-peer communication channel, wherein the special access token is provided by the management server and enables the first client device access to the enterprise resource; and
accessing, by the first client device, the enterprise resource using the special access token.

9. The method of claim 8, wherein the verification data comprises heartbeat information for the first client device, and interrogation information.

10. The method of claim 9, wherein the verification data includes a time-based session token.

11. The method of claim 8, wherein the compliance policy comprises a rule requiring that the first client device needs to be communicatively coupled to the management service before access can be granted to the enterprise resource.

12. The method of claim 8, further comprising encrypting a payload of the peer-to-peer offline access mode request with a private key of the first client device.

13. The method of claim 8, wherein the special access token is time-limited and is set to expire after a defined time period.

14. The method of claim 8, wherein the enterprise resource comprises a data file stored in a data store remote from the first client application, a client application of the first client device, or a client application of the second client device.

15. A non-transitory, computer-readable medium, comprising machine-readable instructions that, when executed by a processor of a first client device, cause the first client device to at least:
detect that the first client device of a user is in an offline state, wherein the first client device is not currently communicatively coupled to a management server, wherein the first client device is enrolled with a management service hosted by the management server;
detect that a second client device of the user is in an online state, wherein the second client device is currently communicatively coupled to the management server, wherein the second client device is enrolled with the management service hosted by the management server;

launch a peer-to-peer communication channel between the first client device and the second client device of the user;

transmit a peer-to-peer offline access mode request over the peer-to-peer communication channel for the first client device to be given access to an enterprise resource that is being managed by the management server, wherein the request includes instructions for the second client device to forward the request to the management server, wherein the request further includes enterprise resource identification and verification data showing that the first client device is in compliance with a compliance policy of the management service; and receive a special access token over the peer-to-peer communication channel, wherein the special access token is provided by the management server and enables the first client device access to the enterprise resource.

16. The non-transitory, computer-readable medium of claim 15, wherein the verification data comprises heartbeat information for the first client device, and interrogation information.

17. The non-transitory, computer-readable medium of claim 16, wherein the verification data includes a time-based session token.

18. The non-transitory, computer-readable medium of claim 15, wherein the compliance policy comprises a rule requiring that the first client device needs to be communicatively coupled to the management service before access can be granted to the enterprise resource.

19. The non-transitory, computer-readable medium of claim 15, wherein the machine-readable instructions further cause the first client device to encrypt a payload of the peer-to-peer offline access mode request with a private key of the first client device.

20. The non-transitory, computer-readable medium of claim 15, wherein the special access token is time-limited and is set to expire after a defined time period.

* * * * *